Patented Jan. 23, 1923.

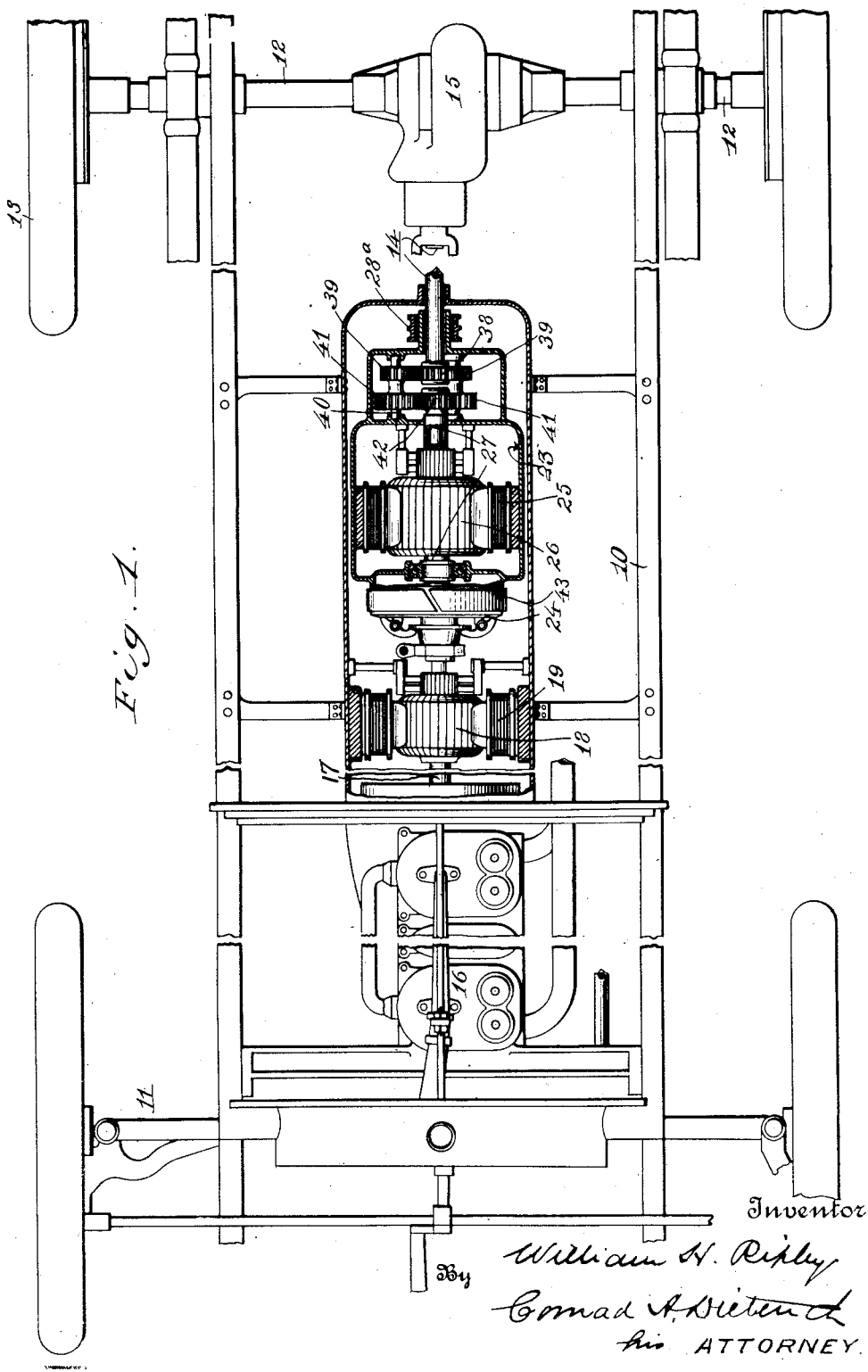

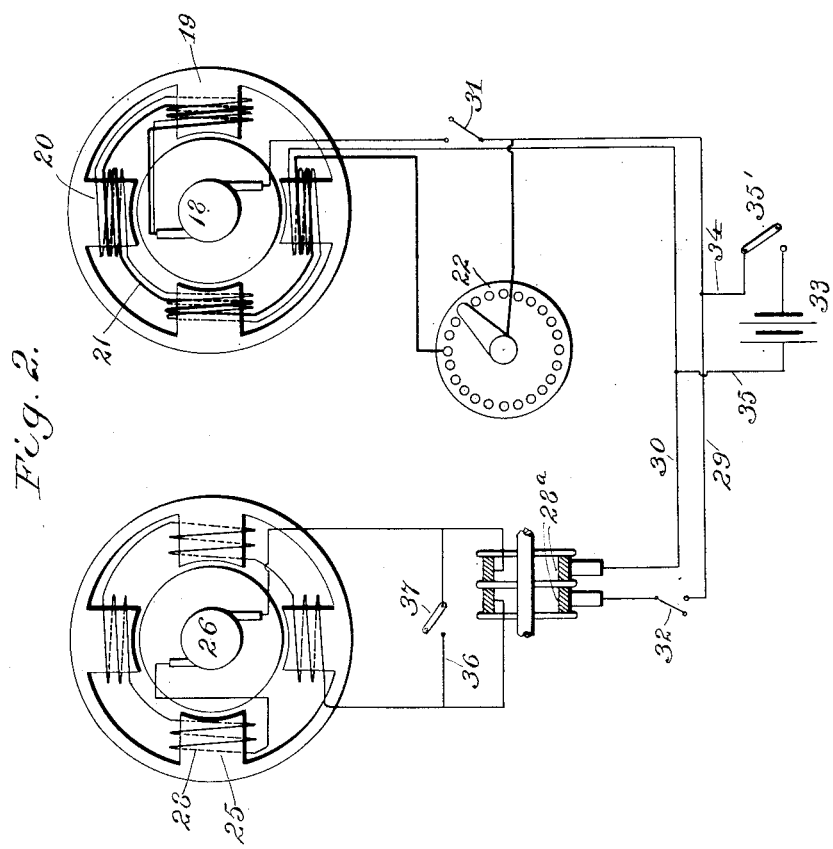

1,442,908

UNITED STATES PATENT OFFICE.

WILLIAM H. RIPLEY, OF ORANGE, NEW JERSEY.

TRANSMISSION MECHANISM.

Application filed November 27, 1916. Serial No. 133,728.

*To all whom it may concern:*

Be it known that I, WILLIAM H. RIPLEY, a citizen of the United States, residing at the city of Orange, Essex County, in the State of New Jersey, have invented certain new and useful Improvements in Transmission Mechanism, of which the following is a full, clear, and exact specification.

This invention relates to improvements in transmission mechanism and is especially adapted for use for automobiles, and has for its object to provide mechanism of this character which will be efficient and by means of which the speed of the automobile may be varied readily.

Further, the invention has for its object to provide transmission mechanism comprising electro-magnetic means for controlling the operation thereof.

Further, the invention has for its object to provide transmission mechanism comprising a driving member and a driven member operatively connected to one another by gearing, and electro-magnetic means for varying the gearing ratio to vary the speed of the automobile.

Other objects will in part be obvious and in part pointed out hereinafter.

To the attainment of the aforesaid objects and ends my invention consists in the novel details of construction, and in the combination, connection and arrangement of parts hereinafter more fully described and then pointed out in the claims.

In the accompanying figures showing an illustrative embodiment of the invention—

Figure 1 is a plan view of a chassis of a motor vehicle with my transmission mechanism mounted thereon, shown partly in section, and Figure 2 is a diagrammatic view showing the circuit connections.

Referring to the drawings 10 indicates the chassis or frame of an automobile supported upon a front axle 11 and rear axles 12, 12 upon which the wheels 13, 13 are mounted. The rear axles 12, 12 are operatively connected to and driven by the shaft 14 by means of a differential gear in the usual manner, which gear is enclosed within a gear box 15. 16 indicates an engine, of any suitable type, supported by the chassis 10 and operatively connected to the driving shaft 17.

Mounted upon the shaft 17 and rotatable therewith is the armature 18 of an electro-magnetic machine the field magnet 19 of which is secured to the chassis 10. This electro magnetic machine 18, 19, is of the compound type being provided with a series winding 20 and a shunt winding 21 having a rheostat 22 in circuit therewith.

Rotatably mounted upon the driving shaft 17 and the driven shaft 14 is a casing 23 which is adapted to be connected to the driving shaft 17 by means of a suitable clutch 24 controlled from the driver's seat of the automobile in the usual manner. Positioned within the casing 23 and secured thereto is the field magnet 25 of an electro-magnetic machine the armature 26 of which is secured to a sleeve 27 rotatably mounted upon the driving shaft 17. This electro-magnetic machine is of the series type being provided with a winding 28 the terminals of which extend through the casing 23 and are in electrical connection with collector rings 28ª, 28ª carried by the casing 23.

From the collector rings 28ª, 28ª conductors 29 and 30 lead to the electro-magnetic machine 18, 19, one of the conductors having switches 31 and 32 in circuit therewith. A battery 33 is connected to the conductors 29 and 30 by branch conductors 34 and 35 one of which is provided with a switch 35'. A conductor 36 having a switch 37 in circuit therewith bridges the terminals of the winding 28 of the electro-magnetic machine 25, 26 whereby the machine may be short circuited by closing the switch 37. The switches 31, 32, 35' and 37 as well as the rheostat 22 are so positioned as to be readily accessible to the person driving the automobile.

Secured to the inner end of the driven shaft 14 and positioned within the casing 23 is a gear wheel 38 which meshes with gear wheels 39 rotatably mounted upon studs 40 carried by the casing 23 and concentrically positioned thereon with respect to the axes of the shafts 14 and 17. Gear wheels 41, also mounted upon the studs 40, are connected to the gear wheels 39, so as to rotate therewith, and mesh with a gear wheel 42 secured to the end of the sleeve 27.

Surrounding the casing 23 and normally out of engagement therewith is a band-brake 43 adapted to be actuated to engage the casing 23 by any suitable means controllable from the driver's seat.

The operation as as follows:—

Assuming the automobile to be standing still the clutch 24 is in its operative position, thereby connecting the casing 23 to the shaft 17, the switches 31, 32, 35' and 37 are open and the rheostat is adjusted so that its resistance is cut out of circuit with the shunt winding 21 of the electro-magnetic machine 18, 19.

To start the engine the switches 31 and 35' are closed thereby connecting the battery 33 to the electro-magnetic machine 18, 19 which thereupon operates as a motor to rotate the driving shaft 17 and start the engine 16, after which the switch 35' is opened to cut out the battery 33. The engine 16 now drives the shaft 17 and the casing 23 which is connected thereto by the clutch 24, and as the casing 23 rotates the studs 40 carrying the gear wheels 39 and 41 will be revolved about the axis of the shafts 14 and 17. Owing to the inertia of the running gear of the automobile, comprising the shaft 14, the differential gearing, the rear axles 12, and the rear wheels 13, the gear wheel 38 will be held stationary, and the gear wheels 39 together with the gear wheels 41 will be caused to rotate upon the studs 40, and the gear wheel 42 together with sleeve 27 and the armatures 26 carried thereby, will be caused to rotate freely about the rotating shaft 17 but in the opposite direction with respect to the direction of rotation of the shaft 17 and the casing 23 operatively connected thereto.

The switch 32 is then closed, the switch 31 being kept in its closed position and the resistance of the rheostat 22 being out of circuit with the shunt winding 21 of the electro-magnetic machine 18, 19. The two electro-magnetic machines 18, 19 and 25, 26 are now electrically connected to one another by the collector rings 28ª and the conductors 29 and 30, but there will be no appreciable interchange of current between the two machines as they are so proportioned and arranged that their terminal voltages will be in opposition and will be substantially equal when the resistance of the rheostat 22 is cut out. As there is no interchange of current between the two electro-magnetic machines no torque will be developed between the rotating field magnet 25 and its oppositely rotating armature 26 and consequently the various parts will still be free to continue to rotate as above described and there will be no movement of the automobile.

To start the automobile the rheostat 22 is operated so as to introduce resistance into the circuit of the shunt winding 21 of the electro-magnetic machine 18, 19, thereby decreasing the terminal voltage of this machine whereupon the electro-magnetic machine 25, 26 now acting as a generator, will begin to deliver current to the electro-magnetic machine 18, 19, now acting as a motor. The energy thus delivered to the machine 18, 19 is transferred into mechanical energy and returned to the engine 16. As soon as the machine 25, 26 begins to act as a generator, thereby causing an inter-change of current from this machine to the machine 18, 19, torque will be developed between the rotating field 25 and the armature 26 owing to the magnetic drag now existing between these members as a result of which the speed of rotation of the armature 26 will be decreased. By reason of this decrease in the speed of rotation of the armature 26 relatively to the speed of rotation of the casing 23, the speed of rotation of the gear wheel 42 will also be decreased as a result of which the rotating gear wheels 41 and 39 will now cause the gear wheel 38 and the shaft 14 upon which it is secured to be rotated, thereby driving the rear axles 12 through the differential gearing and causing the automobile to move forward.

As more and more of the resistance of the rheostat 22 is cut in, the strength of the current flowing between the two machines will increase, thereby increasing the drag between the field 25 and the armature 26. As a result of this increase in drag the speed of rotation of the armature 26 and of the gear wheel 42 in the opposite direction to the rotation of the field 25 will gradually decrease and eventually the armature 26 and the gear wheel 42 will begin to rotate in the same direction as the field 25, and their speed of rotation in this direction will increase until the full resistance of the rheostat 22 is cut in. As the speed of rotation of the gear wheel 42 thus decreases, and then as its speed of rotation in the opposite direction increases, approaching more and more closely to the speed of rotation of the rotating field 25 and the casing 23, the speed of rotation of the gear wheel 38 and the shaft 14 will be increased thereby increasing the speed of the automobile.

When the full resistance of the rheostat 22 has been cut in the electro-magnetic machine 25, 26, may be short circuited by closing the switch 37 of the conductor 36 whereupon the maximum torque between the field 26 and the armature 25 is developed and the automobile is then operating at what may be termed its "high speed." Thus it is seen that the construction shown provides for varying the speed of the gear wheel 38 from zero to full speed, that is throughout the entire operating range, by electrically controlled means.

The gear wheels 38, 39, 41 and 42 constituting the gear train between the shafts 17 and 14 may be so proportioned as to provide any desired ratio between the rotation of the shaft 17 and the rotation of the shaft 14 when the automobile is at its high speed. This ratio automatically varies, causing a corresponding variation in the speed of the automobile, owing to the variations in the drag between the field 25 and the armature 26, being at its maximum when the automobile is started and being at its minimum when the electro-magnetic machine 25, 26 is short-circuited and the automobile is at its high speed. As the ratio decreases the torque will increase, reaching its maximum value when the machine 25, 26 is short circuited.

After the electro-magnetic machine 25, 26 has been short circuited by closing the switch 37 the switch 32 is opened to disconnect it from the machine 18, 19 and if desired the switch 35' may be closed in order to permit the battery 33 to be charged by current from the machine 18, 19, now acting as a generator.

To stop the automobile it is merely necessary to open the various switches, disconnect the clutch 24 and then actuate the band-brake 43 to cause it to engage the casing 23 whereby the rotating parts are brought to rest.

To cause the automobile to move in a reverse or backward direction, the clutch 24 is disconnected, the band-brake 43 is actuated to engage the casing 23 to hold it against rotation and the switches 31 and 32 are closed, whereupon the electro-magnetic machine 18, 19, now acting as a generator will deliver current to the armature 26 of the electro-magnetic machine 25, 26, now acting as a motor, and cause the same to rotate thereby rotating the shaft 14 in the reverse direction. If desired current from the battery 33 may be used to operate the machine 25, 26 to cause the automobile to move in a reverse direction by closing the switches 35' and 32 but the machine 18, 19 is preferably used because its voltage, and, consequently, the speed of the machine 25, 26 can be varied, as shown by the means for varying the voltage of generator 18, 19 effected by the rheostat 22. Thus the direction of rotation of the gear 38 is electrically operated and controlled throughout the entire operating range.

Having thus described my said invention what I claim and desire to secure by Letters Patent is:—

1. An apparatus of the character described, comprising a driving member, a driven member, a gear wheel secured to said driven member, a gear wheel rotatably supported with relation to said driving member, gearing operatively connecting said gear wheels, a support for said gearing with means of actuation from the driving side of the apparatus an electro-magnetic machine operatively associated with said driving member and said support, an electrically controlled and mechanically operated means cooperating with said electro-magnetic machine for varying throughout the entire operating range the speed and direction of rotation of said second mentioned gear wheel relatively to said driving member.

2. An apparatus of the character described, comprising a driving member, a driven member, an electro-magnetic machine having a field structure and an armature, one of said machine members being secured to said driving member and the other rotatably supported with respect to said driving and driven members, a single set of gearing operatively connected to said machine members and to said driven member, a second electro-magnetic machine adapted to be electrically connected to the first named machine whereby the current from said first mentioned machine will be delivered to said second mentioned machine, and means to control rotation of one member of the first machine and means for varying the flow of current between said first named machine and said second named machine to vary the relative rotation of the members of said first named machine, whereby the speed and direction of said driven member will be varied.

3. In combination in a transmission mechanism, a driven shaft and a gear thereon, a prime mover, two electro-magnetic machines each adapted to function as motor or generator under changed conditions of transmission, in combination with gearing constantly in mesh connecting each member of one of said electro-magnetic machines operatively with said gear on said driven shaft, means for preventing rotation of one member of said last mentioned electro-magnetic machine, electrical connections between said electro-magnetic machines, and a rheostat in the field circuit of one of said electro-magnetic machines to vary the speed and direction of rotation of the driven member throughout the entire operating range of the prime mover.

4. In an automobile, a prime mover and its shaft, a dynamo having a stationary field structure and an armature direct coupled to said prime mover shaft, driven wheels and a driven shaft transmitting power thereto, a dynamo-motor interposed between said dynamo and driven shaft having a rotatable field structure and a clutch to couple the same to the dynamo shaft, and a brake operable when said clutch is released to lock said rotatable field structure against rotation, a gear train constantly in mesh interposed between the field structure and the armature of the dynamo-motor and a gear on the driven shaft, electrical connections between the dynamo and the dynamo-motor and means for varying the field strength of one of said machines, whereby the driven shaft speed is controlled by the relative speed of the field structure and armature of one of said dynamo machines.

5. In a transmission mechanism, a prime mover and its shaft, a driven shaft, a dynamo electric machine having its armature mounted on the prime mover shaft and a dynamo-motor having field structure and armature and a clutch whereby one of said members is driven directly from the prime mover shaft, a gear on the other member of the dynamo-motor and a gear on the driven shaft, with interconnecting gearing supported on a frame driven by one member of the dynamo-motor whereby the drive from the prime mover shaft when starting will produce opposite direction of rotation of the dynamo-motor members generating a voltage in balance with the voltage generated by the dynamo electric machine, and means for control of one field circuit for varying the interchange of current between the two electric machines to vary the relative speed of the two members of the dynamo-motor.

6. In a transmission, a prime mover and its shaft, a driven shaft, a dynamo-motor with stationary field structure and an armature driven by the prime mover shaft, a second dynamo-motor, a rotating field structure therefor and a clutch to cause it to be driven directly from the prime mover shaft, and gearing coupling said second mentioned field structure with a gear on the driven shaft and with a gear on the armature of the second dynamo-motor whereby said armature on starting is driven at a speed relative to its field to generate an E. M. F. initially in balance with the E. M. F. of the first mentioned dynamo-motor, a circuit between the two electric machine elements and means of electric control to disturb the balance of E. M. F.'s whereby the armature in the second machine is caused to vary through the gearing the speed of the driven shaft throughout the entire operative range of the driven shaft.

7. In combination in a transmission mechanism, a prime mover and its shaft, a direct coupled dynamo, a driven member for said transmission mechanism, a dynamo-motor cooperating with the prime mover shaft, connection for electrically driving the armature of the dynamo-motor from the dynamo and means of control therefor, mechanical means for driving the dynamo-motor field structure from the dynamo shaft, and alternate means for mechanically controlling the rotation of said field structure, a single set of gearing in constant mesh between the dynamo-motor and the driven member of the transmission.

8. In combination in a transmission mechanism, a driven member, a driving shaft and a dynamo-motor direct coupled therewith, electrical connections and means of control therefor whereby said dynamo-motor may be caused to rotate said shaft, a second dynamo-motor having a rotating field structure and armature, electrical connections between said two dynamo-motors and mechanical means for control of the rotation of the field structure of the second dynamo-motor, a clutch adapted to directly connect said field structure of the second dynamo-motor with the armature shaft of the first dynamo-motor, a single set of gearing between the second dynamo-motor and the driven member.

Signed at the city of New York, in the county and State of New York, this 30th day of September, one thousand and nine hundred and sixteen.

WILLIAM H. RIPLEY.

Witnesses:
  Conrad H. Dieterich,
  Hamilton Anderson.